US010556675B2

(12) United States Patent
Georgin (10) Patent No.: US 10,556,675 B2
(45) Date of Patent: Feb. 11, 2020

(54) SYSTEM AND METHOD FOR AUTOBRAKING WITH COURSE TRAJECTORY ADJUSTMENT

(71) Applicant: GOODRICH CORPORATION, Charlotte, NC (US)

(72) Inventor: Marc Georgin, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 202 days.

(21) Appl. No.: 15/407,778

(22) Filed: Jan. 17, 2017

(65) Prior Publication Data
US 2018/0201367 A1 Jul. 19, 2018

(51) Int. Cl.
*B64C 25/42* (2006.01)
*B64C 25/46* (2006.01)
*B60T 8/17* (2006.01)
*B60T 8/176* (2006.01)
*B60T 8/32* (2006.01)

(52) U.S. Cl.
CPC .......... *B64C 25/426* (2013.01); *B60T 8/1703* (2013.01); *B60T 8/176* (2013.01); *B60T 8/325* (2013.01); *B64C 25/46* (2013.01)

(58) Field of Classification Search
None
See application file for complete search history.

(56) References Cited

U.S. PATENT DOCUMENTS

| 7,165,820 | B2 | 1/2007 | Rudd, III |
| 8,600,584 | B2 | 12/2013 | Fervel et al. |
| 9,199,725 | B2 | 12/2015 | Yelland et al. |
| 9,463,873 | B2 | 10/2016 | Van Deventer et al. |
| 9,507,346 | B1 | 11/2016 | Levinson et al. |
| 2007/0235267 | A1* | 10/2007 | Liebert ................... B60T 7/108 188/1.11 L |
| 2008/0154445 | A1 | 6/2008 | Goodman |

(Continued)

FOREIGN PATENT DOCUMENTS

| EP | 2949527 | 12/2015 |
| EP | 3269604 | 1/2018 |
| GB | 2411934 | 9/2005 |

OTHER PUBLICATIONS

European Patent Office, European Search Report dated Jun. 4, 2018 in Application No. 18151818.4-1012.

(Continued)

*Primary Examiner* — Christian Chace
*Assistant Examiner* — Kyung J Kim
(74) *Attorney, Agent, or Firm* — Snell & Wilmer, L.L.P.

(57) ABSTRACT

Systems and methods for aircraft autobraking are disclosed. The systems and methods may allow for autobraking in both manned and autonomous aircrafts, and may assist in maintaining a desired course during autobraking. The systems and methods may include an aircraft control mode executive module configured to receive manual and/or autonomous brake signal inputs and deceleration signal inputs. The systems and methods may also include various modules configured to aid in calculating, transmitting, and executing pedal brake commands on a braking system, such as, an autobrake controller, a pedal balance controller, an autobrake pedal executive module, a pedal executive module, and/or a pedal braking controller.

18 Claims, 4 Drawing Sheets

(56) References Cited

U.S. PATENT DOCUMENTS

2015/0344129 A1* 12/2015 Georgin ................. B60T 7/042
                                                                701/3
2016/0167653 A1    6/2016 Malone et al.

OTHER PUBLICATIONS

European Patent Office, European Office Action dated Jun. 6, 2019 in Application No. 18151818.4.

* cited by examiner

SYSTEM AND METHOD FOR AUTOBRAKING WITH COURSE TRAJECTORY ADJUSTMENT

FIELD

The present disclosure relates to aircraft autobraking systems, and more specifically, to autobraking systems with course trajectory adjustment capabilities.

BACKGROUND

Modern aircraft are typically equipped with an autobraking system. During a landing phase or a Rejected Take-Off ("RTO") event, a pilot, a remote control, and/or a preprogrammed autonomous logic may engage an autobraking system to assist with decreasing the speed of the plane. The autobraking system may also allow the pilot or the autonomous aircraft to focus on other aspects of achieving a safe landing or successful RTO event. When autobraking is engaged, the aircraft may undesirably veer off a desired course.

SUMMARY

In various embodiments, an aircraft autobraking system is disclosed. The aircraft autobraking system may comprise an aircraft control mode executive module configured to calculate at least one of an aircraft control braking command and an aircraft deceleration target. The aircraft autobraking system may comprise autobrake controller configured to receive the aircraft deceleration target from the aircraft control mode executive module, and calculate an initial autobrake pedal command based on the aircraft deceleration target and an aircraft deceleration feedback. The aircraft autobraking system may comprise a pedal balance controller configured to calculate an autobrake pedal correction factor based on at least one of an aircraft yaw angle, an aircraft yaw speed, and an aircraft wheel speed. The aircraft autobraking system may comprise an autobrake pedal executive module configured to calculate an autobrake pedal command based on at least one of the initial autobrake pedal command and the autobrake pedal correction factor. The aircraft autobraking system may comprise a pedal executive module configured to receive at least one of the aircraft control braking command and the autobrake pedal command, and generate a pedal braking command based on at least one of the aircraft control braking command and the autobrake pedal command.

In various embodiments, the aircraft control mode executive module may be configured to calculate the aircraft control braking command based on at least one of an autonomous brake signal and a manual brake signal. In various embodiments, the aircraft control mode executive module may be configured to calculate the aircraft deceleration target based on at least one of an autonomous autobrake signal and a manual autobrake signal. In various embodiments, the aircraft autobraking system may further comprise a pedal braking controller configured to calculate a final brake command, wherein the final brake command is based on at least one of the pedal braking command and a braking feedback. The pedal braking controller may comprise an antiskid controller, and the final brake command may also be based on an antiskid command. In various embodiments, the pedal executive module may comprise a braking priority logic configured to control the pedal executive module so that in response to receiving both the aircraft control braking command and the autobrake pedal command, the pedal executive module may generate the pedal braking command based on the aircraft control braking command. In various embodiments, the autobrake pedal command may comprise at least one of an autobrake left pedal command and an autobrake right pedal command.

In various embodiments, a method of aircraft autobraking is disclosed. The method may comprise calculating, by an aircraft control mode executive module, at least one of an aircraft control braking command and an aircraft deceleration target. The method may comprise calculating, by an autobrake controller, an initial autobrake pedal command based on at least one of the aircraft deceleration target and an aircraft deceleration feedback. The method may comprise calculating, by a pedal balance controller, an autobrake pedal correction factor based on at least one of an aircraft yaw angle, an aircraft yaw speed, and an aircraft wheel speed. The method may comprise calculating, by an autobrake pedal executive module, an autobrake pedal command based on at least one of the initial autobrake pedal command and the autobrake pedal correction factor. The method may comprise generating, by a pedal executive module, a pedal braking command based on at least one of the autobrake pedal command and the aircraft control braking command.

In various embodiments, the method may also comprise calculating, by the aircraft control mode executive module, the aircraft control braking command based on at least one of an autonomous brake signal and a manual brake signal. In various embodiments, the method may also comprise calculating, by the aircraft control mode executive module, the aircraft deceleration target based on at least one of an autonomous autobrake signal and a manual autobrake signal. In various embodiments, the method may also comprise calculating, by a pedal braking controller, a final brake command, wherein the final brake command is based on at least one of the pedal braking command and a braking feedback. The method may also comprise generating, by an antiskid controller of the pedal braking controller, an antiskid command, wherein the final brake command is also based on the antiskid command. The method may also comprise transmitting, by the pedal braking controller, the final brake command to a braking system. In various embodiments, the pedal executive module may comprise a braking priority logic configured to control the pedal executive module so that in response to receiving both the aircraft control braking command and the autobrake pedal command, the pedal executive module may generate the pedal braking command based on the aircraft control braking command.

In various embodiments, a tangible, non-transitory memory is disclosed. The tangible, non-transitory memory may be configured to communicate with a processor, the tangible, non-transitory memory having instructions stored thereon that, in response to execution by the processor, cause the processor to perform operations. The operations may comprise calculating, by the processor, at least one of an aircraft control braking command and an aircraft deceleration target. The operations may comprise calculating, by the processor, an initial autobrake pedal command based on at least one of the aircraft deceleration target and an aircraft deceleration feedback. The operations may comprise calculating, by the processor, an autobrake pedal correction factor based on at least one of an aircraft yaw angle, an aircraft yaw speed, and an aircraft wheel speed. The operations may comprise calculating, by the processor, an autobrake pedal command based on at least one of the initial autobrake pedal command and the autobrake pedal correction factor. The operations may comprise generating, by the processor, a pedal braking command based on at least one of the autobrake pedal command and the aircraft control braking command.

In various embodiments, the operations may further comprise calculating, by the processor, the aircraft control braking command based on at least one of an autonomous brake signal and a manual brake signal. In various embodiments, the operations may further comprise calculating, by the processor, the aircraft deceleration target based on at least one of an autonomous autobrake signal and a manual autobrake signal. In various embodiments, the operations may further comprise calculating, by the processor, a final brake command, wherein the final brake command is based on at least one of the pedal braking command and a braking feedback. The operations may further comprise generating, by the processor, an antiskid command, wherein the final brake command is also based on the antiskid command. The operations may further comprise transmitting, by the processor, the final brake command to a braking system.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling").

Figure 1:
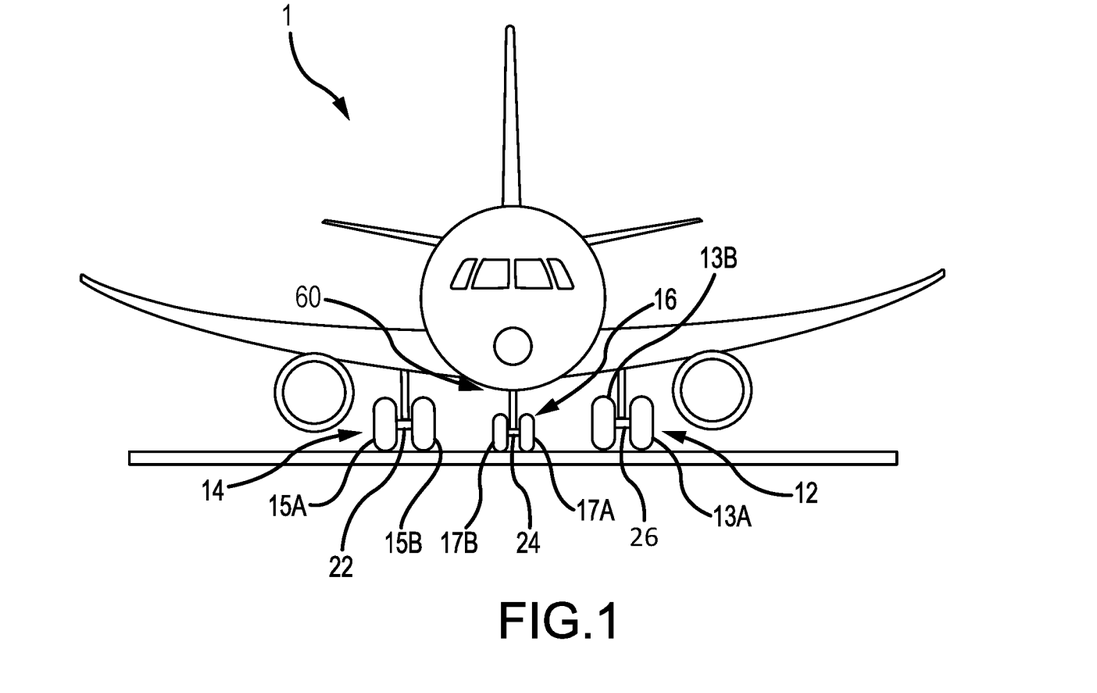
FIG. 1 illustrates an exemplary aircraft, in accordance with various embodiments.

In various embodiments, and with reference to FIG. 1, an exemplary aircraft 1 is depicted. Aircraft 1 may include landing gear such as landing gear 12, landing gear 14 and landing gear 16. Landing gear 12, landing gear 14 and landing gear 16 may generally support aircraft 1 when aircraft 1 is not flying, allowing aircraft 1 to taxi, take off and land without damage. Landing gear 12 may include wheel 13A and wheel 13B coupled by a strut 26; landing gear 14 may include wheel 15A and wheel 15B coupled by a strut 22; and landing gear 16 may include nose wheel 17A and nose wheel 17B coupled by a strut 24. Wheel 13A and wheel 15A may be referred to as outboard wheels. Wheel 13B and wheel 15B may be referred to as inboard wheels. The nose wheels differ from the main wheels in that the nose wheels may not include a brake. In various embodiments, aircraft 1 may comprise any number of landing gears and each landing gear may comprise any number of wheels.

Aircraft 1 may also include a primary braking system 60, which may be applied to any wheel of any landing gear. Braking system 60 of aircraft 1 may comprise a collection of subsystems that produce output signals for controlling the braking force and/or torque applied at each wheel (e.g., wheel 13A, wheel 13B, wheel 15A, wheel 15B, wheel 17A, and/or wheel 17B). Braking system 60 may communicate with the brakes of each landing gear (e.g., landing gear 12, landing gear 14, and/or landing gear 16), and each brake may be mounted to each wheel to apply and release braking force on one or more wheels (e.g., as described herein).

Aircraft wheel and brake assemblies may typically include a non-rotatable wheel support, a wheel mounted to the wheel support for rotation, and a brake disk stack. The brake stack may also have alternating rotor and stator disks mounted with respect to the wheel support and wheel for relative axial movement. Each rotor disk may be coupled to the wheel for rotation therewith, and each stator disk may be coupled to the wheel support against rotation. A back plate may be located at the rear end of the disk stack and a brake head may be located at the front end. The brake head may house one or more actuator rams that extend to compress the brake disk stack against the back plate, or the brake disk stack may be compressed by other means. Torque is taken out by the stator disks through a static torque tube or the like. The actuator rams may be electrically operated actuator rams or hydraulically operated actuator rams, although some brakes may use pneumatically operated actuator rams.

In brake systems that employ fluid powered (hydraulic or pneumatic power) actuator rams, the actuator ram may be coupled to a power source via a brake servo valve (BSV) and a shutoff valve (SOV). The SOV effectively functions as a shutoff valve, wherein in a first position (e.g., an armed position), fluid pressure is permitted to pass through the valve, while in a second position (e.g., a disarmed position) fluid pressure is restricted or prevented from passing through the valve. During normal braking, the SOV is in the armed position, thereby permitting the flow of fluid pressure. The BSV, based on braking commands from the pilot (often via an electronic controller that may implement, for example, anti-skid logic) controls the amount of fluid pressure provided to the actuator ram, and thus, the braking force applied to the wheel. To prevent or minimize unintentional braking (e.g., due to a faulty servo valve) at various times, the SOV is set in the disarmed position, thereby removing or decreasing fluid pressure from the BSV. Since the BSV does not receive sufficient fluid pressure, it cannot provide fluid pressure to the actuator ram, and thus, braking cannot be effected.

In electronic brakes, a brake controller (or controller) is coupled to one or more electromechanical actuator controllers (EMAC) for a brake, which drives one or more electromechanical brake actuators. The brake controller may be in communication with a brake pedal, and thus may control the EMAC in accordance with pilot/copilot braking commands. In various aircraft, other means are used to compress a brake disk stack. A brake controller may comprise a processor and a tangible, non-transitory memory. The brake controller may comprise one or more logic modules that implement brake logic. In various embodiments, the brake controller may comprise other electrical devices to implement brake logic.

Figure 2:
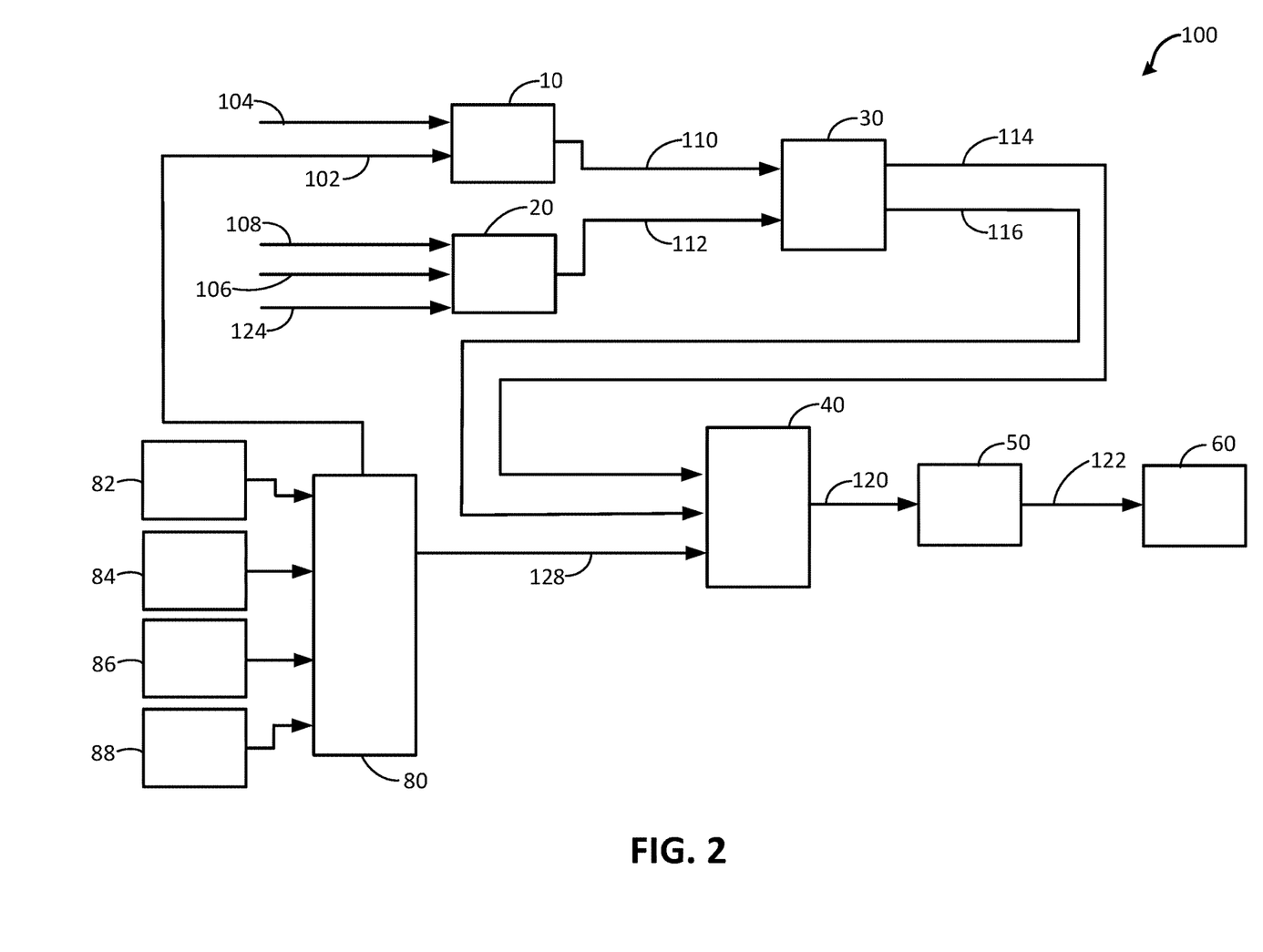
FIG. 2 illustrates a schematic view of an aircraft autobraking system, in accordance with various embodiments.

In various embodiments, and with reference to FIG. 2, an aircraft autobraking system 100 is disclosed. Aircraft autobraking system 100 may be configured to automatically decelerate an aircraft (e.g., aircraft 1 of FIG. 1) during a deceleration event such as, for example, a landing phase, a RTO event, and/or the like. In that respect, aircraft autobraking system 100 may provide brake control capabilities for manual and autonomous braking of manned aircrafts (e.g., pilot commanded) and/or unmanned vehicles such as, for example, an unmanned aerial vehicle, an unmanned aerial system, and/or the like. Aircraft autobraking system 100 may be configured to decelerate the aircraft while maintaining a steady and/or desired course. For example, external factors such as wind, operating conditions of various components of the aircraft (e.g., imbalanced reverse thrusters, differing characteristics of individual braking systems, etc.), and/or the like may cause the aircraft to stray off a desired course of flight. In such conditions, aircraft autobraking system 100 may assist in maintaining the desired course of the aircraft during deceleration. The desired course may comprise, for example, a straight line, notwithstanding environmental factors such as wind and/or ground conditions. Furthermore, aircraft autobraking system 100 may be used to control, for example, two or more aircraft wheels (e.g., wheel 13A, wheel 13B, wheel 15A, wheel 15B, wheel 17A, and/or wheel 17B of FIG. 1). Aircraft autobraking system 100 may be configured to control a left side wheel and a right side wheel independently to allow for differential braking. Any number and configuration of wheels controlled by aircraft autobraking system 100 is within the scope of the present disclosure.

In various embodiments, aircraft autobraking system 100 may comprise various software and/or hardware components, controllers, modules, and/or the like. For example, aircraft autobraking system 100 may comprise an autobrake controller 10, a pedal balance controller 20, an autobrake pedal executive module 30, a pedal executive module 40, an aircraft control mode executive module 80, a pedal braking controller 50, and/or a braking system 60. In various embodiments, braking system 60 may comprise, for example, an electric, a hydraulic, or a hybrid electric-hydraulic braking system, as previously described. Braking system 60 may be configured to control braking force in an aircraft (e.g., aircraft 1 of FIG. 1).

In various embodiments, aircraft autobraking system 100 may also be integrated into computer systems onboard an aircraft (e.g., aircraft 1 of FIG. 1) such as, for example, a brake control unit (BCU), a full authority digital engine control (FADEC), an engine-indicating and crew-alerting system (EICAS), and/or the like. Aircraft autobraking system 100 may also be a standalone computer system separate from the aircraft and in electronic communication with the aircraft, as described in further detail herein. Aircraft autobraking system 100 may include one or more processors and/or one or more tangible, non-transitory memories and be capable of implementing logic. As described herein, each module, "controller", and/or the like may also comprise an individual processor and/or one or more tangible, non-transitory memories and be capable of implementing logic. In other embodiments, each module, controller, and/or the like may also be implemented in a single processor (e.g., aircraft autobraking system 100 may comprise a single processor). Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, aircraft autobraking system 100, and/or each individual module and/or controller, may comprise a processor configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, aircraft autobraking system 100 may comprise an autobrake controller 10. Autobrake controller 10 may be in electronic communication with autobrake pedal executive module 30 and/or aircraft control mode executive module 80. Autobrake controller 10 may also be in electronic communication with various inputs, sensors, and/or the like, as discussed further herein. Autobrake controller 10 may be configured to calculate and/or transmit an initial autobrake pedal command 110. Autobrake controller 10 may calculate the initial autobrake pedal command 110 in response to receiving an aircraft deceleration target 102. Autobrake controller 10 may receive the aircraft deceleration target 102 from any suitable source, such as, for example, from aircraft control mode executive module 80, as discussed further herein. The aircraft deceleration target 102 may comprise data indicative of a desired targeted aircraft deceleration. For example, the aircraft deceleration target 102 may comprise data indicating to decelerate the aircraft at a rate of about 1.0 m/s² (3.28 ft/s²) to about 2.5 m/s² (8.2 ft/s²), about 2.5 m/s² (8.2 ft/s²) to about 3.5 m/s² (11.48 ft/s²), about 3.5 m/s² (11.48 ft/s²) to about 5.0 m/s² (16.4 ft/s²), and/or any other suitable and/or desired deceleration rate (wherein about in this context refers only to +/−1.0 m/s² (3.28 ft/s²)).

In various embodiments, autobrake controller 10 may also be configured to receive an aircraft deceleration feedback 104. Aircraft deceleration feedback 104 may comprise data indicating the current deceleration of the aircraft. Autobrake controller 10 may receive aircraft deceleration feedback 104 from any suitable source. For example, the deceleration of the aircraft may be calculated and/or measured by a wheel speed sensor, a gyroscope sensor, a global positioning system (GPS), and/or any other suitable input, sensor, and/or the like capable of calculating the deceleration of the aircraft.

Autobrake controller 10 may calculate the initial autobrake pedal command 110 based on the aircraft deceleration target 102 and/or the aircraft deceleration feedback 104. For example, in response to the aircraft deceleration feedback 104 comprising data indicating that the aircraft is decelerating at 1.0 m/s² (3.28 ft/s²) and the aircraft deceleration target 102 comprising data indicating that the target deceleration is 2.5 m/s² (8.2 ft/s²), autobrake controller 10 may calculate the initial autobrake pedal command 110 to comprise data indicating that an additional 1.5 m/s² (4.92 ft/s²) of deceleration is needed. Autobrake controller 10 may transmit the initial autobrake pedal command 110 to autobrake pedal executive module 30.

In various embodiments, aircraft autobraking system 100 may comprise a pedal balance controller 20. Pedal balance controller 20 may be in electronic communication with autobrake pedal executive module 30. Pedal balance controller 20 may also be in electronic communication with various inputs, sensors, and/or the like, as discussed further herein. Pedal balance controller 20 may be configured to calculate and/or transmit an autobrake pedal correction factor 112. In various embodiments, pedal balance controller 20 may be configured to calculate a single autobrake pedal correction factor 112 or multiple autobrake pedal correction factors 112 (e.g., pedal balance controller 20 may calculate a separate autobrake pedal correction factor for a left pedal and a right pedal, and/or the like). The autobrake pedal correction factor 112 may comprise data indicating various environmental and operating conditions of the aircraft. For example, pedal balance controller 20 may receive data relating to environmental and/or operating conditions, such as an aircraft yaw angle 108, an aircraft yaw speed 106, an aircraft wheel speed 124, and/or the like. Pedal balance controller 20 may receive the data from any suitable input, sensor, and/or the like. The autobrake pedal correction factor 112 may be based on at least one of the aircraft yaw angle 108, the aircraft yaw speed 106, and/or the aircraft wheel speed 124. In that respect, the autobrake pedal correction factor 112 may be used to modify the initial autobrake pedal command 110 to accommodate for measured environmental and/or operating conditions and assist in maintaining a desired course of the aircraft. Pedal balance controller 20 may transmit the autobrake pedal correction factor 112 to autobrake pedal executive module 30.

In various embodiments, aircraft autobraking system 100 may comprise an autobrake pedal executive module 30. Autobrake pedal executive module 30 may be in electronic communication with autobrake controller 10, pedal balance controller 20, and/or pedal executive module 40. Autobrake pedal executive module 30 may be configured to receive the initial autobrake pedal command 110 and/or the autobrake pedal correction factor 112. Autobrake pedal executive module 30 may receive the initial autobrake pedal command 110 from autobrake controller 10. Autobrake pedal executive module 30 may receive the autobrake pedal correction factor 112 from pedal balance controller 20. Autobrake pedal executive module 30 may be configured to calculate one or more individual pedal braking commands. For example, autobrake pedal executive module 30 may be configured to calculate an autobrake left pedal command 114 and/or an autobrake right pedal command 116. Each autobrake pedal command 114, 116 may be based on the initial autobrake pedal command 110 and/or the autobrake pedal correction factor 112. In that respect, each autobrake pedal command 114, 116 may comprise data indicating the braking force and/or pressure to apply to each corresponding brake. Autobrake pedal executive module 30 may transmit each autobrake pedal command 114, 116 to pedal executive module 40.

In various embodiments, aircraft autobraking system 100 may comprise an aircraft control mode executive module 80. Aircraft control mode executive module 80 may be in electronic communication with autobrake controller 10 and/or pedal executive module 40. Aircraft control mode executive module 80 may also be configured to receive inputs from various sources. For example, aircraft control mode executive module 80 may be in logical and/or electronic communication with an autonomous pedal command module 82, a pilot left and right pedal input 84, an autonomous aircraft deceleration target module 86, and/or a pilot aircraft deceleration target input 88. In that respect, aircraft control mode executive module 80 may be configured as a central hub to receive and transmit deceleration signals and/or braking signals. Aircraft control mode executive module 80 may allow for both manual inputs (e.g., via pilot left and right pedal input 84 and/or pilot aircraft deceleration target input 88) and autonomous inputs (e.g., via autonomous pedal command module 82 and/or autonomous aircraft deceleration target module 86). In that regard, aircraft control mode executive module 80 may be configured to allow manual deceleration input and/or braking control and autonomous deceleration input and/or braking control to aircraft autobraking system 100.

In various embodiments, pilot left and right pedal input 84 may be configured to allow manual input of braking signals. For example, pilot left and right pedal input 84 may be located in the aircraft cockpit, and may comprise physical pedals allowing a pilot and/or copilot to depress the pedals to input a braking signal. Based on the angle or displacement of a depression of the pedals, aircraft control mode executive module 80 may calculate a corresponding braking force for each corresponding pedal to transmit to pedal executive module 40. In various embodiments, autonomous pedal command module 82 may be configured to allow automated and/or remote input of braking signals. For example, autonomous pedal command module 82 may be located onboard or external the aircraft and may comprise preprogrammed data comprising braking signals to transmit (e.g., during a preprogrammed flight, the aircraft, via autonomous pedal command module 82, may be configured to brake at a predefined time, location, and/or the like). Autonomous pedal command module 82 may also be configured to receive remote braking signals, such as, for example, during a remote control of the aircraft.

In various embodiments, aircraft control mode executive module 80 may be configured to calculate an aircraft control braking command 128 based on input received from at least one of autonomous pedal command module 82 and pilot left and right pedal input 84. The aircraft control braking command 128 may comprise a single braking signal or multiple braking signals (e.g., the aircraft control braking command 128 may comprise a separate braking command for a right pedal and a left pedal, and/or the like). The aircraft control braking command 128 may comprise data indicating a braking force to apply to each brake in braking system 60. Aircraft control mode executive module 80 may transmit the aircraft control braking command 128 to pedal executive module 40.

In various embodiments, pilot aircraft deceleration target input 88 may be configured to allow manual input of deceleration signals. For example, pilot aircraft deceleration target input 88 may be located in the aircraft cockpit, and/or in any other suitable location onboard the aircraft. A pilot, copilot, and/or any other suitable user may select a desired deceleration, such as, for example, "low", "medium", "max", "RTO", and/or the like. Each selected deceleration may correspond to a deceleration speed (e.g., "low" may correspond to 1.0 m/s$^2$ (3.28 ft/s$^2$), "medium" may correspond to 2.5 m/s$^2$ (8.2 ft/s$^2$), "max" may correspond to 3.5 m/s$^2$ (11.5 ft/s$^2$), "RTO" may correspond to 5.0 m/s$^2$ (16.4 ft/s$^2$), etc.). Pilot aircraft deceleration target input 88 may transmit the selected deceleration to aircraft control mode executive module 80. In various embodiments, autonomous aircraft deceleration target module 86 may be configured to allow automated and/or remote input of deceleration signals. For example, autonomous aircraft deceleration target module 86 may be located onboard or external the aircraft and may include preprogrammed data comprising deceleration signals to transmit (e.g., during an autonomous flight, the aircraft, via autonomous aircraft deceleration target module 86, may be configured to decelerate at a predefined time, location, and/or the like). Autonomous aircraft deceleration target module 86 may also be configured to receive remote deceleration signals, such as, for example, during a remote control of the aircraft, and transmit the remote deceleration signals to aircraft control mode executive module 80.

In various embodiments, aircraft control mode executive module 80 may also comprise a priority logic (e.g., braking signal priority logic and/or deceleration signal priority logic). For example, in response to receiving input from both autonomous pedal command module 82 and pilot left and right pedal input 84 (e.g., receiving both manual and autonomous braking signals), aircraft control mode executive module 80 may give priority to the manual input (e.g., pilot left and right pedal input 84) and transmit the aircraft control braking command 128 based on that braking signal. As a further example, in response to receiving input from both autonomous aircraft deceleration target module 86 and pilot aircraft deceleration target input 88 (e.g., receiving both manual and autonomous deceleration signals), aircraft control mode executive module 80 may give priority to the manual input (e.g., pilot aircraft deceleration target input 88) and transmit the aircraft deceleration target 102 based on that deceleration signal. In various embodiments, aircraft control mode executive module 80 may provide priority based on any suitable and/or desired priority configuration.

In various embodiments, aircraft autobraking system 100 may comprise a pedal executive module 40. Pedal executive module 40 may be in electronic communication with autobrake pedal executive module 30 and/or aircraft control mode executive module 80. Pedal executive module 40 may be configured to receive various braking commands. For example, pedal executive module 40 may be configured to receive the autobrake left pedal command 114, the autobrake right pedal command 116, and/or the aircraft control braking command 128. Pedal executive module 40 may receive the autobrake left pedal command 114 and/or the autobrake right pedal command 116 from autobrake pedal executive module 30. Pedal executive module 40 may receive the aircraft control braking command 128 from aircraft control mode executive module 80.

In various embodiments, pedal executive module 40 may also be configured to generate a pedal braking command 120. The pedal braking command 120 may comprise data relating to a desired braking force to be applied in braking system 60. In that respect, the pedal braking command 120 may be based on at least one of the aircraft control braking command 128 and/or the autobrake pedal commands 114, 116. Pedal executive module 40 may receive the aircraft control braking command 128 or the autobrake pedal commands 114, 116, analyze each command to determine the braking force to apply to each brake in braking system 60, and may generate the pedal braking command 120 to comprise data indicating that corresponding braking force. For example, wherein braking system 60 comprises a hydraulic braking system, the pedal braking command 120 may comprise a fluid braking pressure (e.g., 200 psi (1379 kPa), 300 psi (2068 kPa), etc.). Wherein braking system 60 comprises an electronic braking system, the pedal braking command 120 may comprise an electronic braking force.

In various embodiments, pedal executive module 40 may also include a braking priority logic. For example, pedal executive module 40 may give priority to received braking signals (e.g., the aircraft control braking command 128) over received deceleration signals (e.g., the autobrake left pedal command 114 and/or the autobrake right pedal command 116). In that respect, in response to receiving both the aircraft control braking command 128 and the autobrake left pedal command 114 and/or the autobrake right pedal command 116, pedal executive module 40 may generate the pedal braking command 120 to comprise data corresponding to the aircraft control braking command 128. Pedal executive module 40 may be configured to transmit the pedal braking command 120 to pedal braking controller 50.

In various embodiments, aircraft autobraking system 100 may comprise a pedal braking controller 50. Pedal braking controller 50 may be in electronic communication with pedal executive module 40 and/or braking system 60. Pedal braking controller 50 may comprise various components, modules, and/or the like. In that respect, and with reference to FIG. 3, pedal braking controller 50 may comprise a brake pedal command controller 52, an antiskid controller 54, and/or a brake control algorithm executive module 56.

Figure 3:
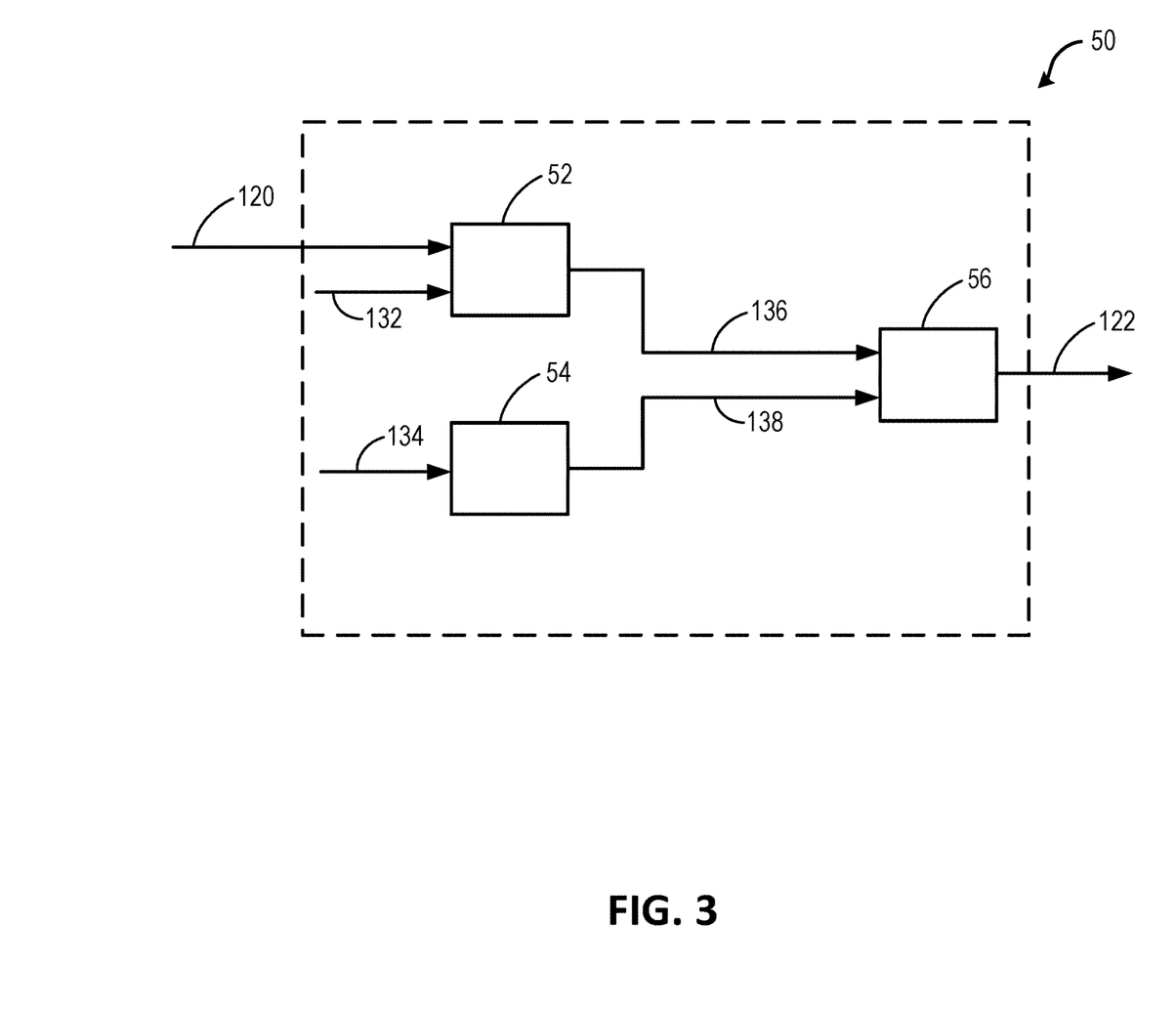
FIG. 3 illustrates a schematic view of a pedal braking controller for an aircraft autobraking system, in accordance with various embodiments.

In various embodiments, brake pedal command controller 52 may be in electronic and/or logical communication with brake control algorithm executive module 56 and/or pedal executive module 40, with brief reference to FIG. 2. Brake pedal command controller 52 may also be in electronic communication with various inputs, sensors, and/or the like, as described further herein. Brake pedal command controller 52 may be configured to receive the pedal braking command 120 from pedal executive module 40. Brake pedal command controller 52 may also receive a braking feedback 132. The braking feedback 132 may comprise data indicating the current braking force and/or pressure being applied to braking system 60. In various embodiments, the braking feedback 132 may comprise data indicating the current braking force and/or pressure being applied to each brake of aircraft 1. In other embodiments, the braking feedback 132 may comprise data indicating the current braking force and/or pressure being applied to multiple brakes of aircraft 1. Brake pedal command controller 52 may be configured to calculate a brake command 136. Brake pedal command controller 52 may calculate the brake command 136 based on the pedal braking command 120 and the braking feedback 132. For example, when the pedal braking command 120 comprises 1000 psi (6895 kPa), and the braking feedback 132 comprises 800 psi (5516 kPa), brake pedal command controller 52 may generate the brake command 136 to comprise an additional 200 psi (1379 kPa) (e.g., to increase the current braking pressure in the aircraft to match the desired braking pressure). Brake pedal command controller 52 may transmit the brake command 136 to brake control algorithm executive module 56.

In various embodiments, antiskid controller 54 may be in electronic and/or logical communication with brake control algorithm executive module 56. Antiskid controller 54 may also be in electronic communication with various inputs, sensors, and/or the like, as discussed further herein. For example, antiskid controller 54 may be configured to receive a wheel speed feedback 134. The wheel speed feedback 134 may be measured by a wheel sensor, and/or the like, and may comprise data indicating the current speed of each wheel in the aircraft. Antiskid controller 54 may analyze the wheel speed feedback 134 and calculate an antiskid command 138. The antiskid command 138 may comprise data indicating a maximum brake pressure and/or force that should be applied to each aircraft wheel. For example, in response to the wheel speed feedback 134 comprising data indicating that a wheel is locking up, antiskid controller 54 may calculate the antiskid command 138 to indicate that no additional braking force and/or pressure should be applied to that corresponding wheel, or that only a maximum of 500 psi (3447 kPa), and/or any other suitable calculated value, should be allowed to that corresponding wheel. Antiskid controller 54 may transmit the antiskid command 138 to brake control algorithm executive module 56.

In various embodiments, brake control algorithm executive module 56 may be in electronic and/or logical communication with brake pedal command controller 52 and/or antiskid controller 54. Brake control algorithm executive module 56 may also be in electronic communication with braking system 60, with brief reference to FIG. 2. Brake control algorithm executive module 56 may be configured to receive the brake command 136. Brake control algorithm executive module 56 may also be configured to receive the antiskid command 138 from antiskid controller 54. Brake control algorithm executive module 56 may be configured to calculate a final brake command 122. The final braking command may be based on the brake command 136 and the antiskid command 138. For example, in response to the brake command 136 having a braking pressure of 1200 psi (8274 kPa) and the antiskid command 138 comprising a maximum braking pressure of 800 psi (5516 kPa), brake control algorithm executive module 56 may generate the final brake command 122 to comprise data indicating a braking pressure of 800 psi (5516 kPa). Brake control algorithm executive module 56 may transmit the final brake command 122 to braking system 60. Braking system 60 may receive the final brake command 122 and may apply braking force and/or pressure to each corresponding aircraft wheel brake to achieve the force and/or pressure commanded by the final brake command 122.

Figure 4:
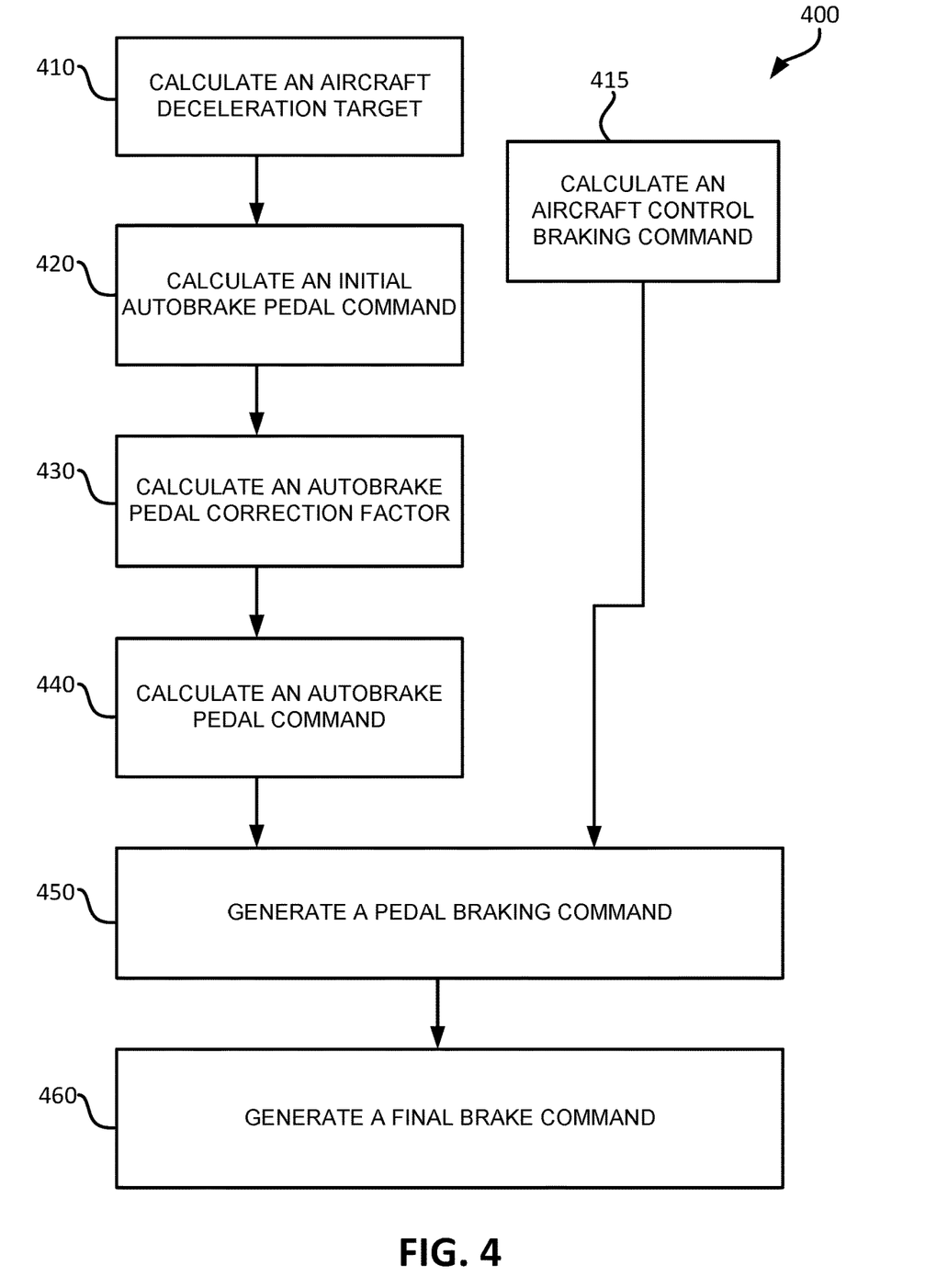
FIG. 4 illustrates a method of aircraft autobraking, in accordance with various embodiments.

In various embodiments, and with reference to FIG. 4, a method 400 of aircraft autobraking is illustrated. As previously discussed, and in various embodiments, method 400 may be configured to automatically decelerate a manned and/or an autonomous aircraft during a landing phase, RTO event, and/or the like while also maintaining a steady course. In various embodiments, method 400 may comprise calculating an aircraft deceleration target (Step 410). Aircraft control mode executive module 80 may calculate the aircraft deceleration target based on input received by autonomous aircraft deceleration target module 86 and/or pilot aircraft deceleration target input 88. Aircraft control mode executive module 80 may transmit the aircraft deceleration target to autobrake controller 10. In various embodiments, method 400 may comprise calculating an aircraft control braking command (Step 415). Aircraft control mode executive module 80 may calculate the aircraft control braking command based on input received by autonomous pedal command module 82 and/or pilot left and right pedal input 84. Aircraft control mode executive module 80 may transmit the aircraft control braking command to pedal executive module 40.

In various embodiments, method 400 may comprise calculating an initial autobrake pedal command (Step 420). Autobrake controller 10 may calculate the initial autobrake pedal command. The initial autobrake pedal command may be based on the aircraft deceleration target and/or an aircraft deceleration feedback. Autobrake controller 10 may transmit the initial autobrake pedal command to autobrake pedal executive module 30.

In various embodiments, method 400 may comprise calculating an autobrake pedal correction factor (Step 430). Pedal balance controller 20 may calculate the autobrake pedal correction factor. The autobrake pedal correction factor may be based on various environmental and/or operating factors, such as, for example, aircraft yaw angle, aircraft yaw speed, aircraft wheel speed, and/or the like. Pedal balance controller 20 may transmit the autobrake pedal correction factor to autobrake pedal executive module 30.

In various embodiments, method 400 may comprise calculating an autobrake pedal command (Step 440). The autobrake pedal command may be calculated by autobrake pedal executive module 30. For example, autobrake pedal executive module 30 may calculate an autobrake left pedal command 114 and/or an autobrake right pedal command 116. Each autobrake pedal command 114, 116 may be based on the autobrake pedal correction factor and the initial autobrake pedal command. Autobrake pedal executive module 30 may transmit each autobrake pedal command 114, 116 to pedal executive module 40.

In various embodiments, method 400 may comprise generating a pedal braking command (Step 450). Pedal executive module 40 may be configured to generate the pedal braking command. The pedal braking command may be based on at least one of the aircraft control braking command and/or the autobrake pedal commands. Pedal executive module 40 may receive the autobrake pedal commands (e.g., autobrake pedal commands 114, 116) from autobrake pedal executive module 30. Pedal executive module 40 may receive the aircraft control braking command from aircraft control mode executive module 80. Pedal executive module 40 may include a braking priority logic. For example, the braking priority logic may dictate how to generate the pedal braking command in response to receiving both the autobrake pedal commands and the aircraft control braking command. For example, in response to receiving both the aircraft control braking command and the autobrake pedal command, pedal executive module 40 may generate the pedal braking command based on the aircraft control braking command. Pedal executive module 40 may transmit the pedal braking command to pedal braking controller 50.

In various embodiments, method 400 may comprise generating a final brake command (Step 460). Pedal braking controller 50 may be configured to generate the final brake command. Pedal braking controller 50 may receive the pedal braking command from pedal executive module 40. The final brake command may be based on at least one of the pedal braking command and/or a braking feedback. Pedal braking controller 50 may comprise an antiskid controller (e.g., antiskid controller 54 of FIG. 3) configured to calculate an antiskid command. The final brake command may also be based on the antiskid command. Pedal braking controller 50 may transmit and/or execute the final brake command on braking system 60. In that regard, the final brake command may cause braking system 60 to cause braking and/or deceleration in the aircraft.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft autobraking system, comprising:
   an aircraft control ode executive module configured to calculate at least one of an aircraft control braking command and an aircraft deceleration target;
   an autonomous pedal command module in electronic communication with the aircraft control mode executive module, the autonomous pedal command module configured to receive remote braking signals;
   a pilot pedal input in electronic communication with the aircraft control mode executive module, the pilot pedal input configured to receive manual braking signals;
   an autonomous aircraft deceleration target module in electronic communication with the aircraft control mode executive module, the autonomous aircraft deceleration target module configured to receive remote deceleration targets;
   a pilot aircraft deceleration target input in electronic communication with the aircraft control mode executive module, the pilot aircraft deceleration target input configured to receive manual deceleration targets;
   an autobrake controller configured to receive the aircraft deceleration target from the aircraft control mode executive module, and calculate an initial autobrake pedal command based on the aircraft deceleration target and an aircraft deceleration feedback;
   a pedal balance controller configured to calculate an autobrake pedal correction factor based on at least one of an aircraft yaw angle, an aircraft yaw speed, and an aircraft wheel speed;
   an autobrake pedal executive module configured to calculate an autobrake pedal command based on at least one of the initial autobrake pedal command and the autobrake pedal correction factor; and
   a pedal executive module configured to receive at least one of the aircraft control braking command and the autobrake pedal command, and generate a pedal braking command based on at least one of the aircraft control braking command and the autobrake pedal command,
   wherein the aircraft control mode executive module further comprises a priority logic configured to control the aircraft control braking command so that in response to receiving both a remote braking signal from the autonomous pedal command module and a manual braking signal from the pilot pedal input, the aircraft control mode executive module generates the aircraft control braking command based on the manual braking signal.

2. The aircraft autobraking system of claim 1, wherein the aircraft control mode executive module is configured to calculate the aircraft control braking command based on an autonomous brake signal.

3. The aircraft autobraking system of claim 1, wherein the aircraft control mode executive module is configured to calculate the aircraft deceleration target based on an autonomous autobrake signal.

4. The aircraft autobraking system of claim 1, further comprising a pedal braking controller configured to calculate a final brake command, wherein the final brake command is based on at least one of the pedal braking command and a braking feedback.

5. The aircraft autobraking system of claim 4, wherein the pedal braking controller comprises an antiskid controller, and wherein the final brake command is also based on an antiskid command.

6. The aircraft autobraking system of claim 1, wherein the pedal executive module comprises a braking priority logic configured to control the pedal executive module so that in response to receiving both the aircraft control braking command and the autobrake pedal command, the pedal executive module may generate the pedal braking command based on the aircraft control braking command.

7. The aircraft autobraking system of claim 1, wherein the autobrake pedal command comprises at least one of an autobrake left pedal command and an autobrake right pedal command.

8. A method of aircraft autobraking, comprising:
receiving, by autonomous pedal command module, a remote aircraft control braking command from a remote source;
receiving, by a pilot pedal input, a manual aircraft control braking command;
receiving, by autonomous aircraft deceleration target module, a remote aircraft deceleration target from the remote source;
calculating, by an aircraft control mode executive module, at least one of an aircraft control braking command and an aircraft deceleration target, wherein the aircraft control braking command is based on the manual aircraft control braking command when both the manual aircraft control braking command from the pilot pedal input and remote braking signal from the autonomous pedal command module is received;
calculating, by an autobrake controller, an initial autobrake pedal command based on at least one of the aircraft deceleration target and an aircraft deceleration feedback;
calculating, by a pedal balance controller, an autobrake pedal correction factor based on at least one of an aircraft yaw angle, an aircraft yaw speed, and an aircraft wheel speed;
calculating, by an autobrake pedal executive module, an autobrake pedal command based on at least one of the initial autobrake pedal command and the autobrake pedal correction factor; and
generating, by a pedal executive module, a pedal braking command based on at least one of the autobrake pedal command and the aircraft control braking command.

9. The method of claim 8, wherein the aircraft deceleration target s based on the remote aircraft deceleration target.

10. The method of claim 8, further comprising calculating, by a pedal braking controller, a final brake command, wherein the final brake command is based on at least one of the pedal braking command and a braking feedback.

11. The method of claim 10, wherein the calculating, by the pedal braking controller, the final brake command is further based on an antiskid command generated by an antiskid controller.

12. The method of claim 10, further comprising transmitting, by the pedal braking controller, the final brake command to a braking system.

13. The method of claim 8, wherein the pedal executive module comprises a braking priority logic configured to control the pedal executive module so that in response to receiving both the aircraft control braking command and the autobrake pedal command, the pedal executive module may generate the pedal braking command based on the aircraft control braking command.

14. A tangible, non-transitory memory configured to communicate with a processor, the tangible, non-transitory memory having instructions stored thereon that, in response to execution by the processor, cause the processor to perform operations comprising:
receiving, by the processor, a remote aircraft control braking command from a remote source;
receiving, by the processor, a manual aircraft braking command;
receiving, by the processor, remote aircraft deceleration target from the remote source;
calculating, by the processor, at least one of an aircraft control braking command and an aircraft deceleration target, wherein the aircraft control braking command is based on the manual aircraft control braking command when both the manual aircraft control braking command from the pilot pedal input and remote braking signal from the autonomous pedal command module is received;
calculating, by the processor, an initial autobrake pedal command based on at least one of the aircraft deceleration target and an aircraft deceleration feedback;
calculating, by the processor, an autobrake pedal correction factor based on at east one of an aircraft yaw angle, an aircraft yaw speed, and an aircraft wheel speed;
calculating, by the processor, an autobrake pedal command based on at least one of the initial autobrake pedal command and the autobrake pedal correction factor; and
generating, by the processor, a pedal braking command based on at least one of the autobrake pedal command and the aircraft control braking command.

15. The tangible, non-transitory memory of claim 14, wherein the operations further comprise calculating, by the processor, the aircraft deceleration target based on the remote aircraft deceleration target.

16. The tangible, non-transitory memory of claim 14, wherein the operations further comprise calculating, by the processor, a final brake command, wherein the final brake command is based on at least one of the pedal braking command and a braking feedback.

17. The tangible, non-transitory memory of claim 16, wherein the operations further comprise generating, by the processor, an antiskid command, wherein the final brake command is also based on the antiskid command.

18. The tangible, non-transitory memory of claim 16, wherein the operations further comprise transmitting, by the processor, the final brake command to a braking system.

* * * * *

UNITED STATES PATENT AND TRADEMARK OFFICE
CERTIFICATE OF CORRECTION

PATENT NO. : 10,556,675 B2
APPLICATION NO. : 15/407778
DATED : February 11, 2020
INVENTOR(S) : Marc Georgin It is certified that error appears in the above-identified patent and that said Letters Patent is hereby corrected as shown below:

In the Claims

Claim 1 - Column 2, Line 8 delete "ode" and insert therefore --mode--

Signed and Sealed this
Nineteenth Day of May, 2020

Andrei Iancu
*Director of the United States Patent and Trademark Office*